US012045000B2

(12) United States Patent
Watanabe et al.

(10) Patent No.: US 12,045,000 B2
(45) Date of Patent: Jul. 23, 2024

(54) IMAGE FORMING APPARATUS

(71) Applicants: Kazuhiko Watanabe, Tokyo (JP); Hiroshi Nakai, Kanagawa (JP)

(72) Inventors: Kazuhiko Watanabe, Tokyo (JP); Hiroshi Nakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/065,200

(22) Filed: Dec. 13, 2022

(65) Prior Publication Data

US 2023/0229107 A1 Jul. 20, 2023

(30) Foreign Application Priority Data

Jan. 19, 2022 (JP) ................................ 2022-006278

(51) Int. Cl.
*G03G 21/00* (2006.01)
*G03G 15/16* (2006.01)

(52) U.S. Cl.
CPC ....... *G03G 21/0094* (2013.01); *G03G 15/161* (2013.01); *G03G 21/0011* (2013.01); *G03G 2215/1661* (2013.01); *G03G 2221/1609* (2013.01)

(58) Field of Classification Search
CPC ........... G03G 21/0094; G03G 21/0011; G03G 15/161; G03G 2215/1661; G03G 2221/1609
See application file for complete search history.

(56) References Cited

U.S. PATENT DOCUMENTS

| | | | |
|---|---|---|---|
| 6,030,736 | A | 2/2000 | Ikegami et al. |
| 6,544,704 | B1 | 4/2003 | Matsuda et al. |
| 10,514,651 | B1 | 12/2019 | Watanabe et al. |
| 2002/0006567 | A1 | 1/2002 | Matsuda et al. |
| 2002/0039698 | A1 | 4/2002 | Sasaki et al. |
| 2002/0081513 | A1 | 6/2002 | Higuchi et al. |

(Continued)

FOREIGN PATENT DOCUMENTS

| | | |
|---|---|---|
| JP | 2005-115311 | 4/2005 |
| JP | 2010-085869 | 4/2010 |

*Primary Examiner* — Stephanie E Bloss
*Assistant Examiner* — Michael A Harrison
(74) *Attorney, Agent, or Firm* — Harness, Dickey & Pierce, P.L.C.

(57) ABSTRACT

An image forming apparatus includes a latent image bearer, an intermediate transferor, a primary transferor, a second transferor, and a cleaning blade. The latent image bearer has a surface onto which a lubricant comprising zinc stearate is supplied. The intermediate transferor has a surface onto which the toner image is transferred, the surface including an adhering region to which the lubricant from the latent image bearer adheres. The cleaning blade cleans the surface of the intermediate transferor including the adhering region, after the toner image is secondarily transferred. In a region outside at least a horizontal A4 sheet passing width on the intermediate transferor, a ratio of a peak area derived from zinc stearate to a peak area derived from the intermediate transferor in a difference spectrum between attenuated total reflection (ATR) infrared absorption spectrums of the intermediate transferor in an unused state and after use is 0.892 or less.

20 Claims, 7 Drawing Sheets

(56) References Cited

U.S. PATENT DOCUMENTS

2002/0090562 A1 7/2002 Sasaki et al.
2002/0102486 A1 8/2002 Higuchi et al.
2002/0155368 A1 10/2002 Iwamoto et al.
2002/0159797 A1 10/2002 Matsuda et al.
2003/0073021 A1 4/2003 Sasaki et al.
2003/0210930 A1 11/2003 Nakai et al.
2004/0058260 A1 3/2004 Katoh et al.
2004/0166428 A1 8/2004 Higuchi et al.
2004/0166429 A1 8/2004 Higuchi et al.
2004/0213600 A1 10/2004 Watanabe et al.
2004/0224247 A1 11/2004 Sasaki et al.
2005/0058474 A1 3/2005 Watanabe et al.
2005/0088697 A1 4/2005 Yasutomi et al.
2005/0100375 A1 5/2005 Naruse et al.
2005/0152707 A1 7/2005 Suzuki et al.
2005/0196193 A1 9/2005 Tamoto et al.
2005/0244176 A1 11/2005 Nakai et al.
2005/0254846 A1 11/2005 Yura et al.
2005/0254868 A1 11/2005 Naruse et al.
2006/0099016 A1 5/2006 Watanabe et al.
2006/0204259 A1 9/2006 Watanabe et al.
2006/0285898 A1 12/2006 Watanabe et al.
2007/0003337 A1 1/2007 Shakuto et al.
2007/0224528 A1 9/2007 Yamashita et al.
2007/0242992 A1 10/2007 Watanabe et al.
2008/0063448 A1 3/2008 Hozumi et al.
2008/0089726 A1* 4/2008 Hatakeyama ...... G03G 21/0094
399/346
2008/0118286 A1 5/2008 Yamashita et al.
2008/0138132 A1 6/2008 Yamashita et al.
2008/0286020 A1 11/2008 Watanabe et al.
2009/0010692 A1 1/2009 Hozumi et al.
2009/0123205 A1 5/2009 Watanabe et al.
2009/0196665 A1 8/2009 Tanaka et al.
2009/0232541 A1* 9/2009 Hatakeyama .......... G03G 15/75
399/111
2009/0279930 A1 11/2009 Kabata et al.
2009/0285613 A1 11/2009 Nakai et al.
2009/0290919 A1 11/2009 Tanaka et al.
2009/0304423 A1 12/2009 Ozaki et al.
2009/0311014 A1 12/2009 Tanaka et al.
2010/0021195 A1 1/2010 Yura et al.
2010/0034560 A1 2/2010 Tanaka et al.
2010/0054829 A1 3/2010 Masato et al.
2010/0067945 A1 3/2010 Hozumi et al.
2010/0067949 A1 3/2010 Watanabe et al.
2010/0183972 A1 7/2010 Hasegawa et al.
2010/0209143 A1 8/2010 Nakai et al.
2010/0239309 A1 9/2010 Tanaka et al.
2010/0278558 A1 11/2010 Enoki et al.
2010/0310291 A1 12/2010 Tanaka et al.
2011/0008088 A1 1/2011 Nakai et al.
2011/0038656 A1 2/2011 Hasegawa et al.
2011/0052286 A1 3/2011 Urayama et al.
2011/0085824 A1 4/2011 Hatakeyama et al.
2011/0129269 A1 6/2011 Seo et al.
2011/0129270 A1 6/2011 Seo et al.
2011/0229186 A1 9/2011 Okamoto et al.
2011/0229188 A1 9/2011 Watanabe et al.
2011/0229233 A1 9/2011 Watanabe et al.
2012/0057912 A1 3/2012 Hasegawa et al.
2012/0063809 A1 3/2012 Tanaka et al.
2012/0063825 A1 3/2012 Hasegawa et al.
2012/0195662 A1 8/2012 Hasegawa et al.
2012/0207507 A1 8/2012 Okamoto et al.
2013/0071163 A1 3/2013 Watanabe et al.
2013/0216286 A1 8/2013 Hasegawa et al.
2013/0259552 A1 10/2013 Hasegawa et al.
2013/0315642 A1 11/2013 Nakai et al.
2014/0030644 A1 1/2014 Hasegawa et al.
2014/0093294 A1 4/2014 Komito et al.
2014/0119769 A1 5/2014 Kikuchi et al.
2014/0161501 A1 6/2014 Watanabe et al.
2014/0193172 A1* 7/2014 Tawada .............. G03G 21/0029
399/346
2014/0233998 A1 8/2014 Watanabe et al.
2014/0341629 A1 11/2014 Watanabe et al.
2015/0139710 A1 5/2015 Hasegawa et al.
2015/0355566 A1 12/2015 Kikuchi et al.
2015/0370217 A1 12/2015 Shimizu et al.
2016/0097987 A1 4/2016 Kikuchi et al.
2016/0109846 A1 4/2016 Shimizu et al.
2016/0259293 A1 9/2016 Shimizu et al.
2016/0320738 A1 11/2016 Tawada et al.
2017/0038724 A1 2/2017 Shimizu et al.
2017/0068207 A1 3/2017 Shimizu et al.
2017/0090399 A1 3/2017 Komito et al.
2017/0146944 A1 5/2017 Shimizu et al.
2017/0199493 A1 7/2017 Watanabe et al.
2018/0196387 A1 7/2018 Watanabe
2018/0373198 A1 12/2018 Mizusawa et al.
2021/0034010 A1 2/2021 Watanabe et al.
2021/0216032 A1 7/2021 Watanabe et al.
2021/0325802 A1 10/2021 Kumagai et al.
2022/0299909 A1 9/2022 Shiodera et al.

* cited by examiner

IMAGE FORMING APPARATUS

CROSS-REFERENCE TO RELATED APPLICATIONS

This patent applications is based on and claims priority pursuant to 35 U.S.C. § 119(a) to Japanese Patent Application No. 2022-006278, filed on Jan. 19, 2022, in the Japan Patent Office, the entire disclosure of which is hereby incorporated by reference herein.

BACKGROUND

Technical Field

Embodiments of the present disclosure relate to an image forming apparatus.

Related Art

Conventionally known is an image forming apparatus that executes an image forming operation of primarily transferring, to an intermediate transferor, a toner image on the surface of a latent image bearer to which a lubricant is supplied and then secondarily transferring the toner image from the intermediate transferor onto a recording sheet of paper, and cleans, with a cleaning blade, the surface of the intermediate transferor after the secondary transfer.

For example, known is an image forming apparatus that rubs a protective-agent bar containing zinc stearate with a brush or the like, into a powdery protective agent (lubricant) to apply the powdery protective agent to a photoconductor (latent image bearer). In this image forming apparatus, toner particles remaining on an intermediate transfer belt (intermediate transferor) after a secondary transfer are cleaned with a cleaning member of a belt cleaning device.

SUMMARY

According to an embodiment of the present disclosure, an image forming apparatus includes a latent image bearer, an intermediate transferor, a primary transferor, a second transferor, and a cleaning blade. The latent image bearer has a surface onto which a lubricant comprising zinc stearate is supplied. The latent image bearer bears a toner image on the surface. The intermediate transferor has a surface onto which the toner image is transferred, the surface including an adhering region to which the lubricant from the surface of the latent image bearer adheres. The primary transferor primarily transfers the toner image from the surface of the latent image bearer to the surface of the intermediate transferor. The second transferor secondarily transfers the toner image from the surface of the intermediate transferor to a recording sheet. The cleaning blade cleans the surface of the intermediate transferor including the adhering region, after the toner image is secondarily transferred. In a region outside at least a horizontal A4 sheet passing width on the intermediate transferor, a ratio of a peak area derived from zinc stearate to a peak area derived from the intermediate transferor in a difference spectrum between an attenuated total reflection (ATR) infrared absorption spectrum of the intermediate transferor in an unused state and an ATR infrared absorption spectrum of the intermediate transferor after use is 0.892 or less.

According to another embodiment of the present disclosure, an image forming apparatus includes a latent image bearer, an intermediate transferor, a primary transferor, a second transferor, and a cleaning blade. The latent image bearer has a surface onto which a lubricant comprising boron nitride is supplied. The latent image bearer bears a toner image on the surface. The intermediate transferor has a surface onto which the toner image is transferred, the surface including an adhering region to which the lubricant from the surface of the latent image bearer adheres. The primary transferor primarily transfers the toner image from the surface of the latent image bearer to the surface of the intermediate transferor. The second transferor secondarily transfers the toner image from the surface of the intermediate transferor to a recording sheet. The cleaning blade cleans the surface of the intermediate transferor including the adhering region, after the toner image is secondarily transferred. In a region outside at least a horizontal A4 sheet passing width on the intermediate transferor, a ratio of a peak area derived from boron nitride to a peak area derived from the intermediate transferor in a difference spectrum between an attenuated total reflection (ATR) infrared absorption spectrum of the intermediate transferor in an unused state and an ATR infrared absorption spectrum of the intermediate transferor after use is 1.152 or less.

According to still another embodiment of the present disclosure, an image forming apparatus includes a latent image bearer, an intermediate transferor, a primary transferor, a second transferor, and a cleaning blade. The latent image bearer has a surface onto which a lubricant comprising zinc stearate and boron nitride is supplied. The latent image bearer bears a toner image on the surface. The intermediate transferor has a surface onto which the toner image is transferred, the surface including an adhering region to which the lubricant from the surface of the latent image bearer adheres. The primary transferor primarily transfers the toner image from the surface of the latent image bearer to the surface of the intermediate transferor. The second transferor secondarily transfers the toner image from the surface of the intermediate transferor to a recording sheet. The cleaning blade cleans the surface of the intermediate transferor including the adhering region, after the toner image is secondarily transferred. In a region outside at least a horizontal A4 sheet passing width on the intermediate transferor, a ratio of a peak area derived from zinc stearate to a peak area derived from the intermediate transferor in a difference spectrum between an attenuated total reflection (ATR) infrared absorption spectrum of the intermediate transferor in an unused state and an ATR infrared absorption spectrum of the intermediate transferor after use is 0.892 or less, and a ratio of a peak area derived from boron nitride to the peak area derived from the intermediate transferor in the difference spectrum is 1.152 or less.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
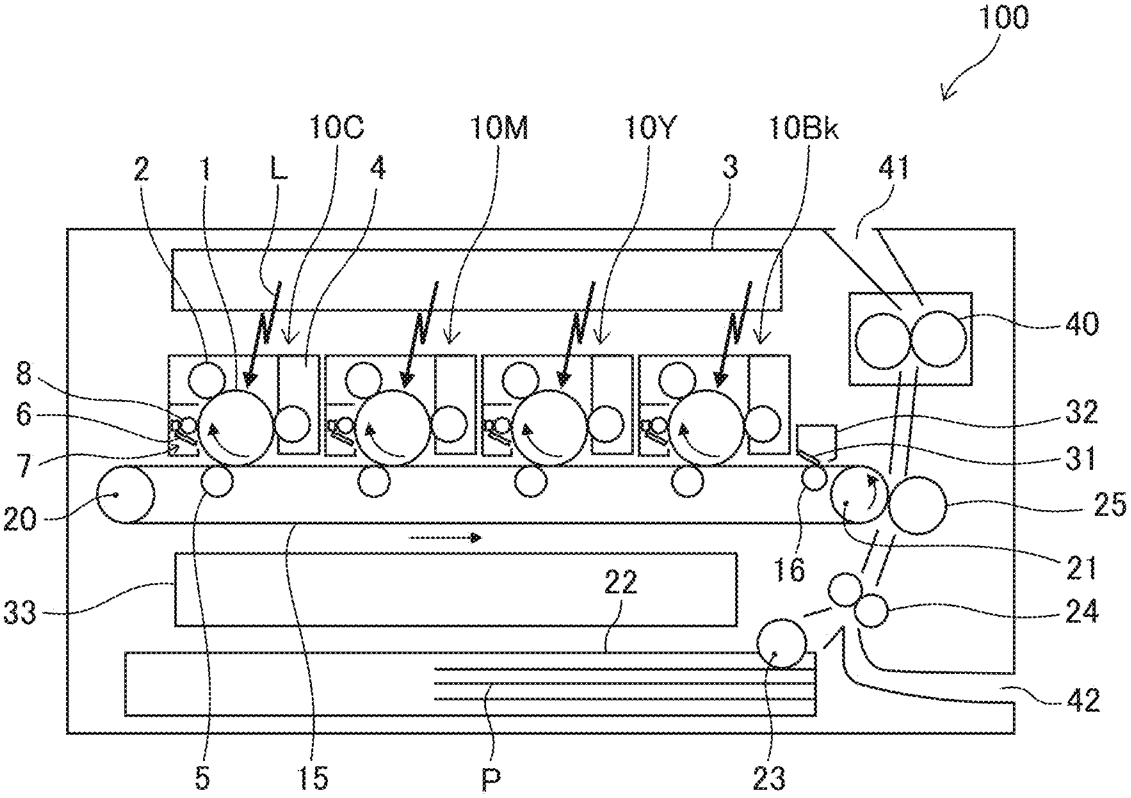
FIG. 1 is a schematic view of the configuration of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic view of the configuration of the printer according to the present embodiment.

In the printer illustrated in FIG. 1, four process units 10Bk, 10Y, 10M, and 10C are provided at the center of a printer main body 100, and are detachably attached to the printer main body 100. The process units 10Bk, 10Y, 10M, and 10C have similar respective configurations except that the process units 10Bk, 10Y, 10M, and 10C contain respective developers of different colors of black (Bk), yellow (Y), magenta (M), and cyan (C) corresponding to color separation components of a color image. Therefore, in a case where the colors are not particularly distinguished, the description of Bk, Y, M, C, and the like is omitted after the reference signs of the respective members.

Each of the process units 10 includes a photoconductor 1 that is a latent image bearer, a charging roller 2 that charges the surface of the photoconductor, a developing device 4, and a cleaning device 7 that cleans the surface of the photoconductor. The photoconductor 1 is a cylindrical drum.

The cleaning device 7 includes a cleaning blade 6 that comes in counter contact with the photoconductor 1. The cleaning blade 6 scrapes transfer residue toner on the photoconductor 1 to perform the cleaning. Instead of the blade cleaning scheme, an electrostatic scheme, such as an electrostatic brush scheme or an electrostatic roller scheme, may be mounted.

Provided over the process units 10 is an exposure device 3 as a latent image forming unit for exposing the surface of each of the photoconductors 1. The exposure device 3 includes a light source, a polygon mirror, an f-O lens, and a reflection mirror. On the basis of image data, the exposure device 3 irradiates the surface of each of the photoconductors 1 with laser beam L.

An intermediate transfer belt 15 as an intermediate transferor is provided under the process units 10. The intermediate transfer belt 15 is an endless belt, and is stretched by and hung on a secondary-transfer opposite roller 21, a cleaning backup roller 16, and a tension roller 20.

Materials used for the intermediate transfer belt 15 include vinylidene fluoride (PVDF), ethylene-tetrafluoroethylene copolymer (ETFE), polyimide (PI), polycarbonate (PC), and thermoplastic elastomer (TPE). In these materials, a conductive material, such as carbon black, is dispersed to make an endless belt like a resin film. The endless belt is used as the intermediate transfer belt.

In the present embodiment, the secondary-transfer opposite roller 21 is rotationally driven by a belt driving motor to rotate the intermediate transfer belt 15 in a direction indicated by an arrow in the drawing. Springs apply pressures to both axial ends of the tension roller 20, so that the tension roller 20 applies tension to the intermediate transfer belt 15. A driving source of the process units that drives the photoconductors 1 and the like, and the driving source that rotationally drives the secondary-transfer opposite roller 21 may be either independent from each other or common. However, in general, at least the driving of the process unit for black and the secondary-transfer opposite roller 21 is simultaneously turned ON or OFF. Therefore, it is desirable that the driving source of the process unit for black and the driving source of the secondary-transfer opposite roller 21 are common to reduce the size and cost of the main body.

The four primary transfer rollers 5 serving as primary transferors are conductive sponge rollers or metal rollers (aluminum or steel use stainless (SUS)). The four primary transfer rollers 5 and the respective photoconductors 1 sandwich the intermediate transfer belt 15, respectively, to form primary transfer nips. A primary-transfer high-voltage power supply is coupled to each of the primary transfer rollers 5, and a primary-transfer bias from the high-voltage power supply is applied to each of the primary transfer rollers 5 to form a transfer electric field. In a case where conductive sponge rollers are used as the primary transfer rollers 5, ion conductive rollers (urethane+carbon dispersion, nitrile rubber (NBR), or hydrin rubber), electronic conductive rollers (ethylene propylene diene monomer (EPDM) rubber), or the like are used.

A secondary transfer roller 25 and the secondary-transfer opposite roller 21 sandwich the intermediate transfer belt 15 to form a secondary transfer nip. Similarly to the primary transfer rollers 5, a secondary-transfer high-voltage power supply is coupled to the secondary transfer roller 25 as a secondary transferor, and a predetermined secondary transfer bias from the high-voltage power supply is applied to the secondary transfer roller 25 to form a transfer electric field.

As the secondary transfer bias, there are two schemes of an attractive-force transfer scheme and a repulsive-force transfer scheme. In the attractive-force transfer scheme, a positive bias is applied to the secondary transfer roller 25, and the secondary-transfer opposite roller 21 is grounded to form a secondary transfer electric field. In the repulsive-force transfer scheme, a negative bias is applied to the secondary-transfer opposite roller 21, and the secondary transfer roller 25 is grounded to form a secondary transfer electric field.

The secondary transfer roller 25 is a sponge roller, and an ion conductive roller (urethane+carbon dispersion, NBR, or hydrin rubber), an electronic conductive roller (EPDM), or the like is used. Further, a secondary transfer cleaning unit may be provided to remove adhering things, such as toner, that adhere to the surface of the secondary transfer roller 25.

Further, as a secondary transfer unit that secondarily transfers a toner image on the intermediate transfer belt onto a recording sheet of paper P (hereinafter, a recording sheet P) as a recording material or medium, a belt scheme using a secondary transfer belt may be used. The secondary transfer belt is stretched by and hung on a tension roller and a driving roller that faces the intermediate transfer belt with the secondary transfer belt interposed between the driving roller and the intermediate transfer belt. A secondary transfer bias is applied to the driving roller.

A belt cleaning device 32 includes an intermediate transfer cleaning blade 31 that is in counter contact with the intermediate transfer belt 15. The intermediate transfer cleaning blade 31 scrapes transfer residue toner on the intermediate transfer belt 15 to perform the cleaning. Instead of the blade cleaning scheme, an electrostatic scheme, such as an electrostatic brush scheme or an electrostatic roller scheme, may be mounted. However, in a case of the electrostatic scheme, a cleaning brush or roller to which a bias is applied is arranged instead of the intermediate transfer cleaning blade 31. As a result, it may be necessary to preliminarily charge the transfer residue toner depending on the use situation of the image forming apparatus, and there are disadvantages such that the cleaning unit itself becomes large, one to two systems of high-voltage power supply are added, and extra operations for the bias cleaning are necessary. Therefore, in the present embodiment, the blade cleaning scheme is adopted from the viewpoint of the downsizing and cost reduction of the main body, and cleaning property.

Provided in a lower portion of the printer main body 100 are a sheet feeding tray 22 that contains recording sheets P, a sheet feeding roller 23 that conveys out a recording sheet P from the sheet feeding tray 22, and the like. In addition to plain paper, examples of the recording sheet P include recording materials (including materials that are not paper) that can be objects on which an image is formed, such as thick paper, postcards, envelopes, thin paper, coated paper (coated paper, art paper, and the like), tracing paper, and overhead projector (OHP) sheets. Also provided is a bypass feeding port 42 through which a recording sheet set on a bypass feeder is conveyed.

In the printer main body 100, a conveyance path is disposed to eject a recording sheet P from the sheet feeding tray 22 or the bypass feeder to the outside of the apparatus through the secondary transfer nip. In this configuration, vertical passing is used for the sheet feeding. In the conveyance path, a pair of registration rollers 24 as a conveyance unit that conveys a recording sheet P to the secondary transfer nip is disposed upstream from the position of the secondary transfer roller 25 in the recording sheet conveyance direction.

A fixing device 40 for fixing an unfixed image transferred to the recording paper P is also disposed downstream from the position of the secondary transfer roller 25 in the recording sheet conveyance direction.

The basic operations of the image forming apparatus having the above configuration are as follows:

In response to the start of an image forming operation, the photoconductors 1 in the respective process units 10 are rotationally driven in the clockwise direction in the drawing by a driving device. The roller-shaped charging rollers 2 are pressed against the surfaces of the respective photoconductors 1, and the charging rollers 2 are rotated by the rotation of the photoconductors 1. Then a bias of a DC voltage or a bias in which an AC voltage is superimposed on a DC voltage is applied to the charging rollers 2 by a high-voltage power supply, so that the charging rollers 2 uniformly charge the surfaces of the photoconductors 1 to a predetermined polarity.

The charged surface of each of the photoconductors 1 is irradiated with writing light from the exposure device 3, so that an electrostatic latent image is formed on the surface of each of the photoconductors 1. At this time, the image information exposed to each of the photoconductors 1 is monochrome image information obtained by separating a desired full-color image into color information of yellow, magenta, cyan, and black. This exposure step is performed with a laser beam scanner using a laser diode, a light emitting diode (LED), or the like.

The developing devices 4 supply the electrostatic latent images on the respective photoconductors 1 with toner carried on the respective developing rollers, so that the electrostatic latent images are made to appear as toner images (made to be visible images). In this developing step, a predetermined developing bias is applied to the developing rollers of the developing devices 4 from the high-voltage power supply.

In response to the start of the image forming operation, the secondary-transfer opposite roller 21 also performs rotational driving in the counterclockwise direction in the drawing to make the intermediate transfer belt 15 rotationally travel in a direction indicated by an arrow in the drawing. Then a predetermined transfer bias of a constant voltage or a controlled constant current having a polarity opposite to the charging polarity of the toner is applied to each of the primary transfer rollers 5. As a result, transfer electric fields are formed at the respective primary transfer nips between the respective primary transfer rollers 5 and the respective photoconductors 1.

Then when the toner images of the respective colors on the photoconductors 1 reach the primary transfer nips as the respective photoconductors 1 rotate, the toner images on the respective photoconductors 1 are sequentially superimposed and transferred onto the intermediate transfer belt 15 by the transfer electric fields at the primary transfer nips. In this manner, a full-color toner image is carried on the surface of the intermediate transfer belt 15.

The toner on each of the photoconductors 1 that has not been transferred to the intermediate transfer belt 15 is removed by the cleaning device 7. Then a lubricant supply device 8 supplies a lubricant, and a neutralizing device neutralizes the surface of each of the photoconductors 1 to initialize the surface potential.

In the lower portion of the printer main body 100, the sheet feeding roller 23 starts rotational driving to send out a recording sheet P from the sheet feeding tray 22 to the conveyance path. The recording sheet P sent out to the conveyance path is sent to the secondary transfer nip by the pair of registration rollers 24 at a timing that corresponds to the timing at which the leading edge of the toner image on the surface of the intermediate transfer belt 15 reaches the secondary transfer nip between the secondary transfer roller 25 and the secondary-transfer opposite roller 21. At this time, a transfer bias having a polarity opposite to the toner charging polarity of the toner image on the intermediate transfer belt 15 is applied to the secondary transfer roller 25, so that a transfer electric field is formed at the secondary transfer nip.

Then when the toner images on the intermediate transfer belt 15 reach the secondary transfer nip as the intermediate transfer belt 15 rotates, the toner images on the intermediate transfer belt 15 are collectively transferred onto the recording sheet P by the transfer electric field at the secondary transfer nip.

At this time, residual toner on the intermediate transfer belt 15 that has not been transferred to the recording sheet P is removed by the belt cleaning device 32. The removed toner passes through a toner conveyance passage, is conveyed to and collected in a waste toner container 33 disposed between the intermediate transfer belt 15 and the sheet feeding tray 22.

The recording sheet P is separated from the intermediate transfer belt 15 by the curvature of the secondary-transfer opposite roller 21, and conveyed to the fixing device 40. The fixing device 40 fixes the toner image on the recording sheet P to the recording sheet P by heat and pressure. Then the recording sheet P is ejected through an ejection port 41 to the outside of the apparatus.

In this way, the series of image forming process in the printer according to the present embodiment is completed.

The printer according to the present embodiment also includes a belt contact-separation mechanism that brings and separates the intermediate transfer belt 15 into contact with and from the photoconductors 1 of the process units except the Bk-color process unit. At the time of forming a full-color image, the belt contact-separation mechanism is controlled such that the intermediate transfer belt 15 is brought into contact with each of the photoconductors 1. At the time of forming a monochrome image, the belt contact-separation mechanism is controlled such that the intermediate transfer belt 15 is separated from the photoconductors 1 of the process units except the Bk-color process unit.

Figure 2:
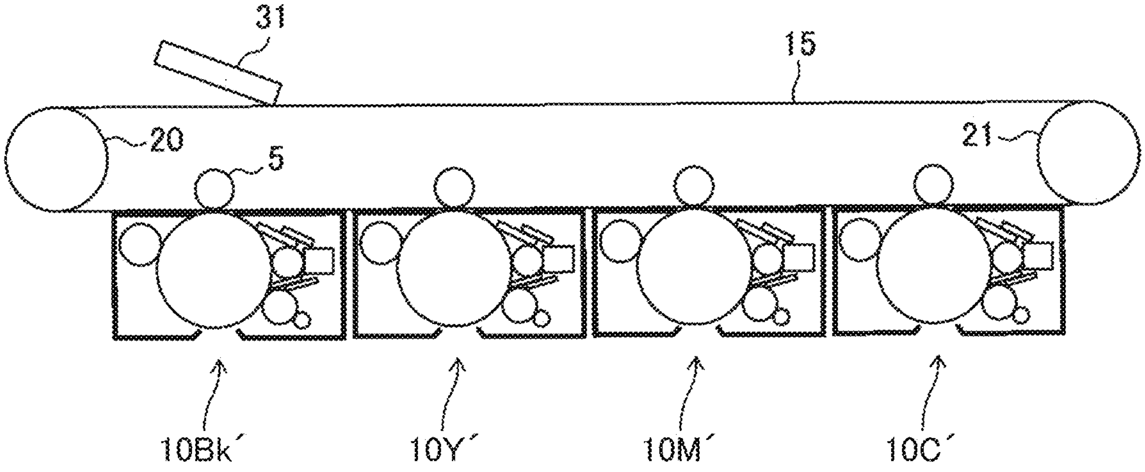
FIG. 2 is a schematic view illustrating the configuration of another example in the printer in FIG. 1.

The arrangement relationship between the process units 10 and the intermediate transfer belt is not limited to the arrangement relationship illustrated in FIG. 1, and as illustrated in FIG. 2, the intermediate transfer belt 15 as an intermediate transferor may be provided over the process units 10.

Figure 3:
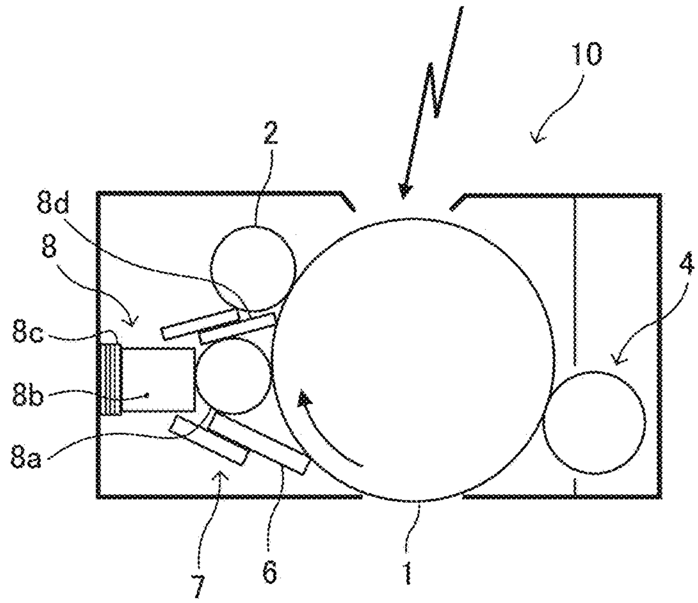
FIG. 3 is a schematic view illustrating the configuration of a process unit according to an embodiment of the present disclosure.

FIG. 3 is a schematic view illustrating the configuration of an example of the process unit 10 in the present embodiment.

As illustrated in FIG. 3, the process unit 10 according to the present embodiment includes the lubricant supply device 8 as a lubricant supplier. The lubricant supply device 8 mainly includes a lubricant supply member 8*a* including a foam roller, a solid lubricant 8*b*, a pressing-force applying mechanism 8*c*, and a lubricant layer forming mechanism 8*d*.

The solid lubricant 8*b* is in contact with the lubricant supply member 8*a* by the pressing force from the pressing-force applying mechanism 8*c*. The lubricant supply member 8*a* is rotationally driven to coat and thus supply the surface of the photoconductor 1 with the powdery lubricant obtained by rubbing and scraping the solid lubricant 8*b*. The lubricant supply member 8*a* rotates with a linear velocity different from the linear velocity of the photoconductor 1, and thus rubs the photoconductor 1, and at this time, the powdery lubricant held on the surface of the lubricant supply member 8*a* is supplied to the surface of the photoconductor.

Since after the transfer step, deteriorated lubricant, toner, and the like remain on part of the surface of the photoconductor 1, the surface residues are cleaned by the cleaning blade 6, and the residual toner and the deteriorated lubricant on the surface of the photoconductor are removed. Therefore, the lubricant from the lubricant supply member 8*a* is supplied to the cleaned surface of the photoconductor, and is leveled by the lubricant layer forming mechanism 8*d*, so that the thickness of the powdery lubricant is reduced, so that a lubricant layer is formed on the surface of the photoconductor.

Next, the solid lubricant 8*b* in the present embodiment will be described.

The present embodiment is on the assumption that a lubricant is used to improve the cleaning property of the surface of the photoconductor. The solid lubricant 8*b* in the present embodiment is made of a lubricant or includes a lubricant, and has a block shape elongated in the rotation axis direction of the photoconductor 1.

The material of the solid lubricant 8*b* may be a material that uniformly and quickly spreads on the surface of the photoconductor, and serves to cover the surface of the photoconductor, and at the same time, provide lubricity to protect the cleaning blade 6.

Specifically, inorganic lubricants, fatty-acid metal salts, waxes, oils, and fluororesins are exemplified. In the present embodiment, the solid lubricant 8*b* includes a fatty-acid metal salt (A) and an inorganic lubricant (B), and the fatty-acid metal salt (A) and the inorganic lubricant (B) are mixed to be used.

In the present embodiment, as the form of the solid lubricant 8*b*, a block-shaped solid lubricant is used because the supply amount is easily adjusted, the apparatus is downsized, and the like. The solid lubricant 8*b* in the present embodiment may be referred to as a lubricant bar, a lubricant block, or the like.

The method for molding the solid lubricant 8*b* is appropriately selected, and for example, publicly known methods, such as melt molding in which a material is melted, poured into a mold, and then cooled and solidified, and compression molding in which a powder material is compressed to obtain a molded object, are used. In the present embodiment, the compression molding may be used in that the solid lubricant 8*b* is ground with a weaker force for the supply onto the photoconductor because the hardness is easily adjusted.

Examples of the fatty-acid metal salt (A) include barium stearate, lead stearate, iron stearate, nickel stearate, cobalt stearate, copper stearate, strontium stearate, calcium stearate, cadmium stearate, magnesium stearate, zinc stearate, zinc oleate, magnesium oleate, iron oleate, cobalt oleate, copper oleate, lead oleate, manganese oleate, zinc palmitate, cobalt palmitate, lead palmitate, magnesium palmitate, aluminum palmitate, calcium palmitate, lead caprylate, lead caprate, zinc linolenate, cobalt linolenate, calcium linolenate, zinc ricinoleate, cadmium ricinoleate, barium laurate, lithium laurate, calcium laurate, and zinc laurate. Mixtures thereof may also be used.

Above all, zinc stearate is particularly excellent in film formation property on the photoconductor 1, and thus is used as a main component of the lubricant in the present embodiment. The main component in the present embodiment means that the weight ratio in the entire lubricant is more than 50%.

Though zinc stearate is excellent in uniform film formation property, zinc stearate is likely to change in quality by charging stress. In a normal image formation process, a blade cleaning scheme is adopted as a means for removing residual toner from the photoconductor after transfer. However, if zinc stearate is used, when a charging hazard is applied, zinc stearate tends to change in quality, so that the lubricity decreases, and the toner more easily passes through the blade.

If the toner passes through the cleaning blade, the toner directly appears in the image or the contamination of the charging member is accelerated. This toner passing through appears more conspicuously as the toner particle size is smaller and the charging hazard is stronger. At the same time, if there is much passing through of the toner and like, the cleaning blade is worn, and thus the life of the process unit 10 become short.

Considering the above, in the present embodiment, the fatty-acid metal salt (A) and the inorganic lubricant (B) are mixed to be used. The inorganic lubricant (B) in the present embodiment refers to an inorganic compound that splits and lubricates or causes internal slippage. In the present embodiment, in a case where zinc stearate is used as the fatty-acid metal salt (A), the inorganic lubricant (B) is not particularly limited.

In the present embodiment, examples of the inorganic lubricant (B) include talc, mica, boron nitride, molybdenum disulfide, tungsten disulfide, kaolin, smectite, hydrotalcite compound, calcium fluoride, graphite, plate-like alumina, sericite, and synthetic mica.

Among them, boron nitride is preferable as the inorganic lubricant (B), and is used in the present embodiment. Boron nitride easily splits and lubricates because hexagonal mesh surfaces in which atoms are firmly combined are superimposed at wide intervals, and only weak van der Waals force acts between the layers. In addition, using boron nitride further increases the effect on the cleaning property of the photoconductor. The inorganic lubricant (B) may be subjected to a surface treatment as necessary for the purpose of imparting hydrophobicity or the like. In the present embodiment, in a case where boron nitride is used as the inorganic lubricant (B), the fatty-acid metal salt (A) is not particularly limited, and may not be zinc stearate.

Although such a lubricant is applied to the surface of the photoconductor, it has been found that the lubricant is transferred from the surface of the photoconductor onto the intermediate transfer belt little by little through image formation processes. It has been found that as a result, filming on the intermediate transfer belt 15 is increased with time.

This filming phenomenon is particularly noticeable in an outer adhering region corresponding to both ends of the intermediate transfer belt 15. The reason is that the sheet of paper produces the effect of removing the lubricant in the sheet-passing region, but the effect is not obtained in the outer adhering region. In a case where the filming on the intermediate transfer belt 15 deteriorates, the frictional force between the intermediate transfer cleaning blade 31 and the intermediate transfer belt 15 increases, and thus curling of the intermediate transfer cleaning blade 31 (blade-curling) occurs.

The present inventors have found that the occurrence of the blade-curling is suppressed by restricting, to predetermined amounts or less, the adhering amounts of zinc stearate and boron nitride in the outer adhering region (a region outside at least the horizontal A4 sheet passing width) within the width of the adhering region on the intermediate transfer belt 15 to which the lubricant from the photoconductors 1 adheres.

As a method for grasping the adhering amounts of zinc stearate and boron nitride, an attenuated total reflection (ATR) infrared absorption spectrum is used. The ATR is one of methods for measuring an infrared absorption spectrum, and uses total reflection. In the ATR, an ATR prism having a high refractive index is brought into close contact with a sample, the sample is irradiated with infrared light through the ATR prism, and the light emitted from the ATR prism is spectrally analyzed. If infrared light is made to enter the ATR prism under a condition of a certain angle or more, the infrared light does not exit from the prism from the relationship between the refractive index of the ATR prism and the refractive index of the sample, and total reflection occurs at the contact surface between the ATR prism and the sample. Since at this time, the infrared light enters the sample by a slight distance, if the sample absorbs the infrared light, the reflected light is attenuated, and the absorption spectrum of the sample is obtained.

The ATR measures an absorption spectrum of a very thin sample portion in contact with the ATR prism, and thus has an advantage that even a thick sample or a sample having low permeability is measured as long as the sample is brought into close contact with the ATR prism. Since the ATR allows a functional group to be determined from a wave number at which absorption of the infrared light occurs, the ATR is often used for qualitative analysis. However, the ATR is not basically used for quantitative analysis since the peak intensity of the absorption spectrum varies by a pressure with which the sample is pressed. However, it has been found that the relative adhering amount of the lubricant is calculated using, as an index, the ratio of the areas of the peaks obtained by the ATR, and thus the adhering amount of the lubricant on the intermediate transfer belt 15 is determined.

Specifically, a difference spectrum between an ATR infrared absorption spectrum of an unused intermediate transfer belt 15 and an ATR infrared absorption spectrum of the intermediate transfer belt after use is obtained. To obtain the adhering amount of zinc stearate, the ratio of the peak area derived from zinc stearate to the peak area derived from the intermediate transfer belt in the difference spectrum is used as an index value indicating the adhering amount of zinc stearate (hereinafter referred to as a "ZnST index"). To obtain the adhering amount of boron nitride, the ratio of the peak area derived from boron nitride to the peak area derived from the intermediate transfer belt in the difference spectrum is used as an index value indicating the adhering amount of boron nitride (hereinafter referred to as a "BN index").

In the present embodiment, these ZnST index and BN index are used to restrict index values of zinc stearate and boron nitride (the ZnST index and the BN index) in the outer adhering region on the intermediate transfer belt 15 to predetermined amounts or less to suppress the occurrence of the blade-curling.

FIGS. 4A to 4D are explanatory diagrams illustrating outer adhering regions in the present embodiment.

In the present embodiment, the width of the lubricant supply region on the photoconductor 1 to which the lubricant is supplied from the lubricant supply device 8 is larger than the width of the intermediate transfer belt 15, and thus the entire width-direction region of the intermediate transfer belt 15 is included in the width of the lubricant supply region on the photoconductor 1. Therefore, in the present embodiment, the lubricant from the photoconductor 1 adheres to the entire outer adhering region on the intermediate transfer belt 15.

Figure 4A:
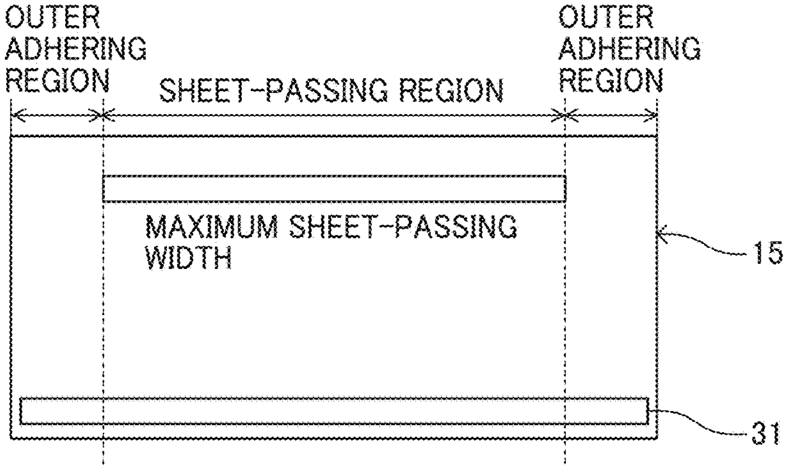
FIG. 4A is an explanatory diagram illustrating an outer adhering region in an embodiment of the present disclosure.

FIG. 4A illustrates the relationship between the width of the intermediate transfer belt and the maximum sheet-passing width (enlarged A3 width=329 mm) usable in the printer according to the present embodiment. Since in the example in FIG. 4A, the maximum sheet-passing width is used, the outer adhering region illustrated in FIG. 4A is a region that does not come into contact with a recording sheet P of any size at all, and thus is a region where the filming is most likely to deteriorate and the blade-curling is most likely to occur. Therefore, in order to prevent the occurrence of the curling of the intermediate transfer cleaning blade 31, it is effective to suppress the deterioration of the filming in the outer adhering region with respect to the maximum sheet-passing width, and it is preferable to restrict the ZnST index and the BN index of the outer adhering region to predetermined values or less.

Figure 4B:
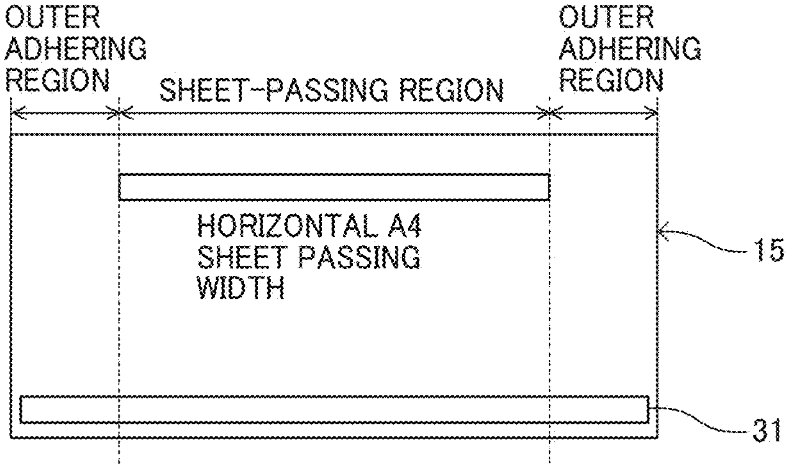
FIG. 4B is an explanatory diagram illustrating an outer adhering region in an embodiment of the present disclosure.

FIG. 4B illustrates the relationship between the width of the intermediate transfer belt and the sheet-passing region width (=297 mm) in a case of horizontal A4 size sheet passing that is generally often used. In the example in FIG. 4B, an outer adhering region is the sides outside, in the width directions, of the sheet-passing region through which a recording sheet P of horizontal A4 size sheet passing passes. In addition to the horizontal A4 size sheet passing, in general, an image is also formed on a recording sheet P of the A3 size or the like. Therefore, in the outer adhering region at the time of the horizontal A4 size sheet passing, a recording sheet P having a larger width is passed through a portion inside the maximum sheet-passing width, so that the lubricant may be removed. However, in a use situation where the horizontal A4 size sheet passing is overwhelmingly frequent, the lubricant is not sufficiently removed by sometimes passing recording sheets P having wider sizes. Therefore, the outer adhering region at the time of horizontal A4 size sheet passing is also a region where the filming is likely to deteriorate and the blade-curling is likely to occur. In particular, since the outer adhering region at the time of horizontal A4 size sheet passing is wider than the outer adhering region at the time of the maximum sheet-passing width, the frictional force between the intermediate transfer belt 15 and the intermediate transfer cleaning blade 31 is likely to increase when the filming deteriorates. Therefore, in order to prevent the occurrence of the curling of the intermediate transfer cleaning blade 31, it is also preferable to suppress the deterioration of the filming in the outer adhering region at the time of horizontal A4 size sheet passing, and it is preferable to restrict the ZnST index and the BN index of the outer adhering region to the predetermined values or less.

Figure 4C:
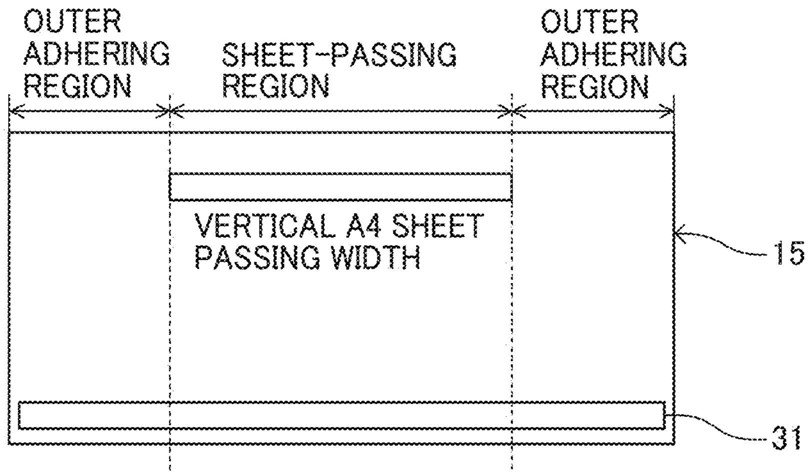
FIG. 4C is an explanatory diagram illustrating an outer adhering region in an embodiment of the present disclosure.

FIG. 4C illustrates the relationship between the width of the intermediate transfer belt and the sheet-passing region width (=210 mm) in a case of lengthways A4 size sheet passing.

Figure 4D:
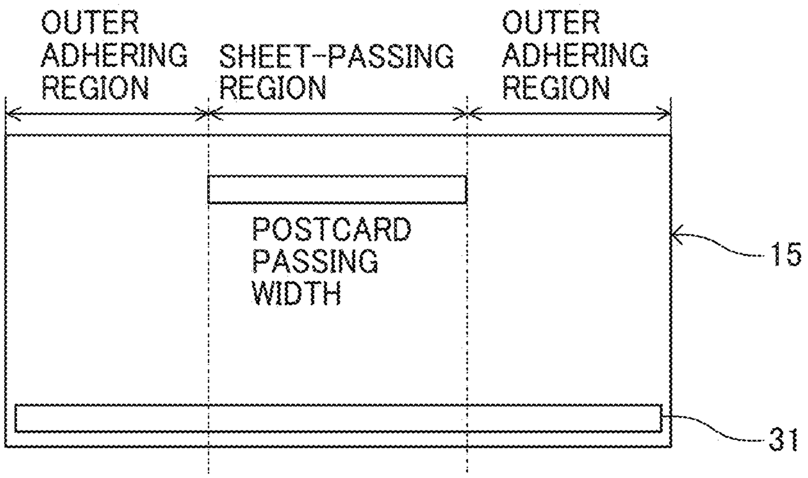
FIG. 4D is an explanatory diagram illustrating an outer adhering region in an embodiment of the present disclosure.

FIG. 4D illustrates the relationship between the width of the intermediate transfer belt 15 and the sheet-passing region width (=148 mm) in a case of postcard passing.

In the examples illustrated in FIGS. 4C and 4D, similarly to the example in FIG. 4B, in a case where image formation is performed with only sheets of respective widths passing, the outer adhering region is also a region where the filming is likely to deteriorate and the blade-curling is likely to occur. In particular, since the outer adhering regions in the examples in FIGS. 4C and 4D are wider than the outer adhering region at the time of the maximum sheet-passing width, and also are wider than the example in FIG. 4B, the frictional force between the intermediate transfer belt 15 and the intermediate transfer cleaning blade 31 is likely to increase when the filming deteriorates. Therefore, in order to prevent the occurrence of the curling of the intermediate transfer cleaning blade 31, it is also preferable to suppress the deterioration of the filming on the outer adhering region in the examples in FIGS. 4C and 4D, and it is preferable to restrict the ZnST index and the BN index of the outer adhering region to the predetermined values or less.

Next, a method for quantifying filming substances (method for calculating index values) will be described.

The studies by the present inventors reveal that main filming substances on the intermediate transfer belt 15 that deteriorate the blade-curling are zinc stearate and boron nitride. Therefore, in the present embodiment, zinc stearate and boron nitride on the intermediate transfer belt 15 are quantified by the following quantification method. The quantified index values (ZnST index and BN index) are used to restrict the adhering amounts of the filming substances in the outer adhering region (a region outside at least the horizontal A4 sheet passing width) to predetermined amounts or less not to cause the blade-curling on the intermediate transfer belt 15.

Figure 5A:
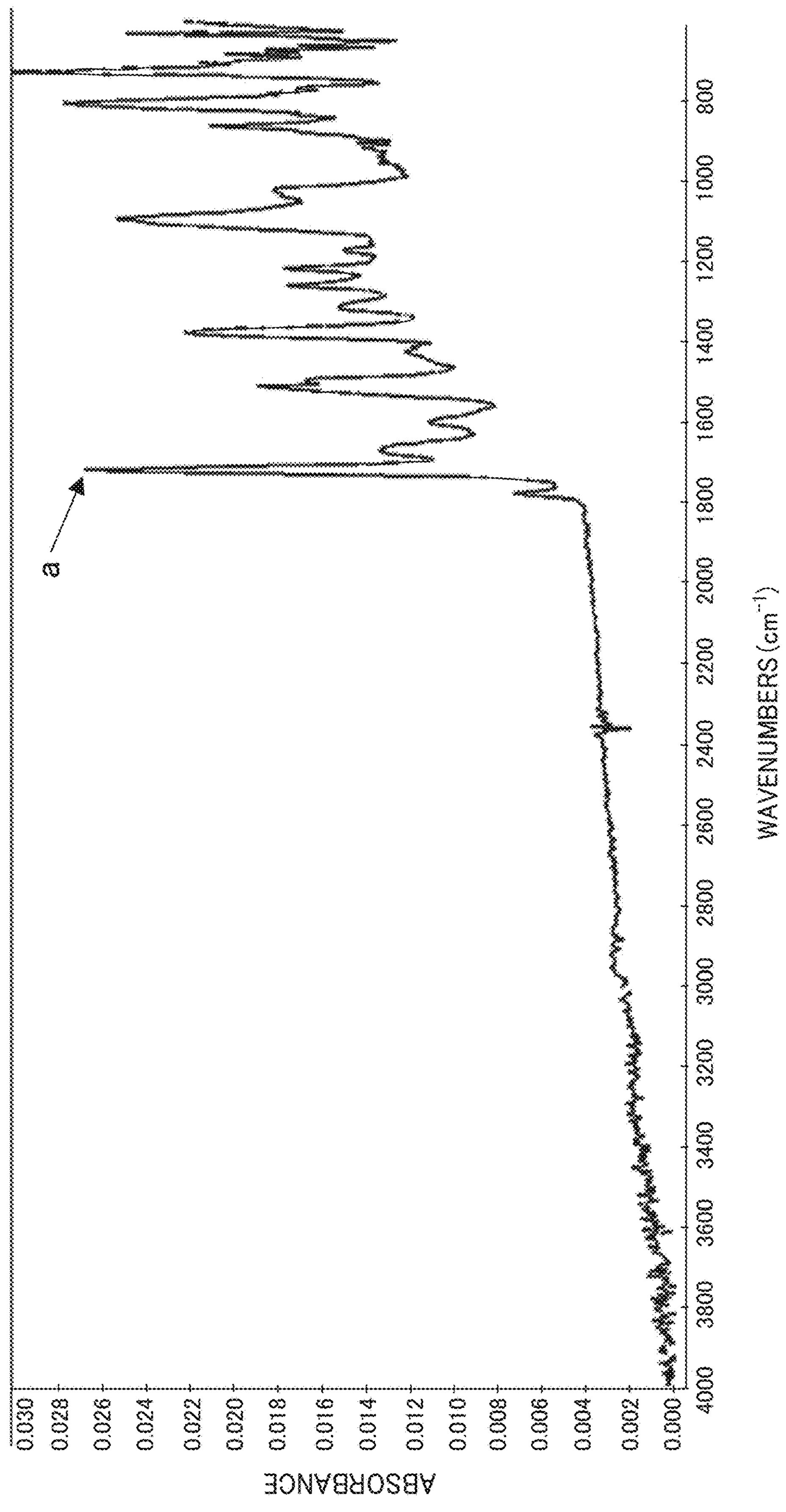
FIG. 5A is a graph illustrating the result of measurement of an attenuated total reflection (ATR) infrared absorption spectrum of an outer adhering region of an unused intermediate transfer belt.

FIG. 5A is a graph illustrating the result of measurement of an ATR infrared absorption spectrum of an outer adhering region of an unused intermediate transfer belt 15.

Figure 5B:
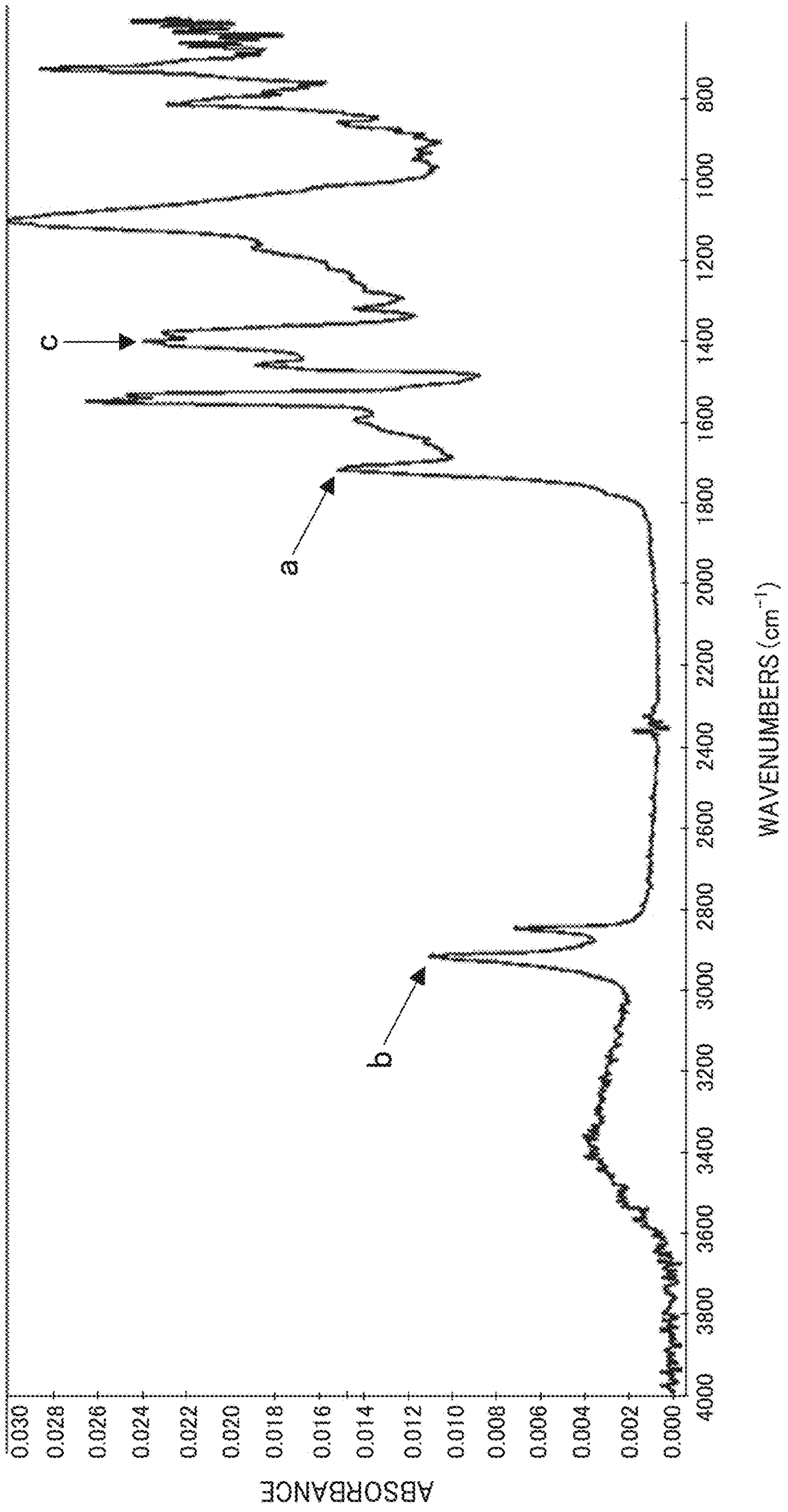
FIG. 5B is a graph illustrating the result of measurement of an ATR infrared absorption spectrum of the outer adhering region of the intermediate transfer belt after use.

FIG. 5B is a graph illustrating the result of measurement of an ATR infrared absorption spectrum of the outer adhering region of the intermediate transfer belt 15 after use.

The ATR infrared absorption spectrum was measured using FT/IR-6100 (manufactured by JASCO Corporation). The measurement was performed in a non-destructive manner in a state where the intermediate transfer belt was removed from the intermediate transfer unit without cutting the intermediate transfer belt into sample pieces. A measurement position on the intermediate transfer belt was pressed against a measurement unit of the FT/IR-6100 with a force of about 3 kgf to perform the measurement. As a result of the ATR IR analysis on the unused intermediate transfer belt and the intermediate transfer belt after use, the obtained IR spectra (absorbance spectra) are illustrated in FIGS. 5A and 5B.

In each of the spectra in FIGS. 5A and 5B, a peak a derived from carbonate bonds contained in the intermediate transfer belt 15 (that is, a peak a derived from the intermediate transfer belt) was observed at 1718.93 $cm^{-1}$. In the spectrum after use in FIG. 5B, a peak b derived from zinc stearate was observed at 2918 $cm^{-1}$, and a peak c derived from boron nitride was observed at 1370 $cm^{-1}$. The peak b of zinc stearate and the peak c derived from boron nitride in the spectrum after use in FIG. 5B did not overlap with the peak derived from the intermediate transfer belt (peak a and the like).

Figure 6:
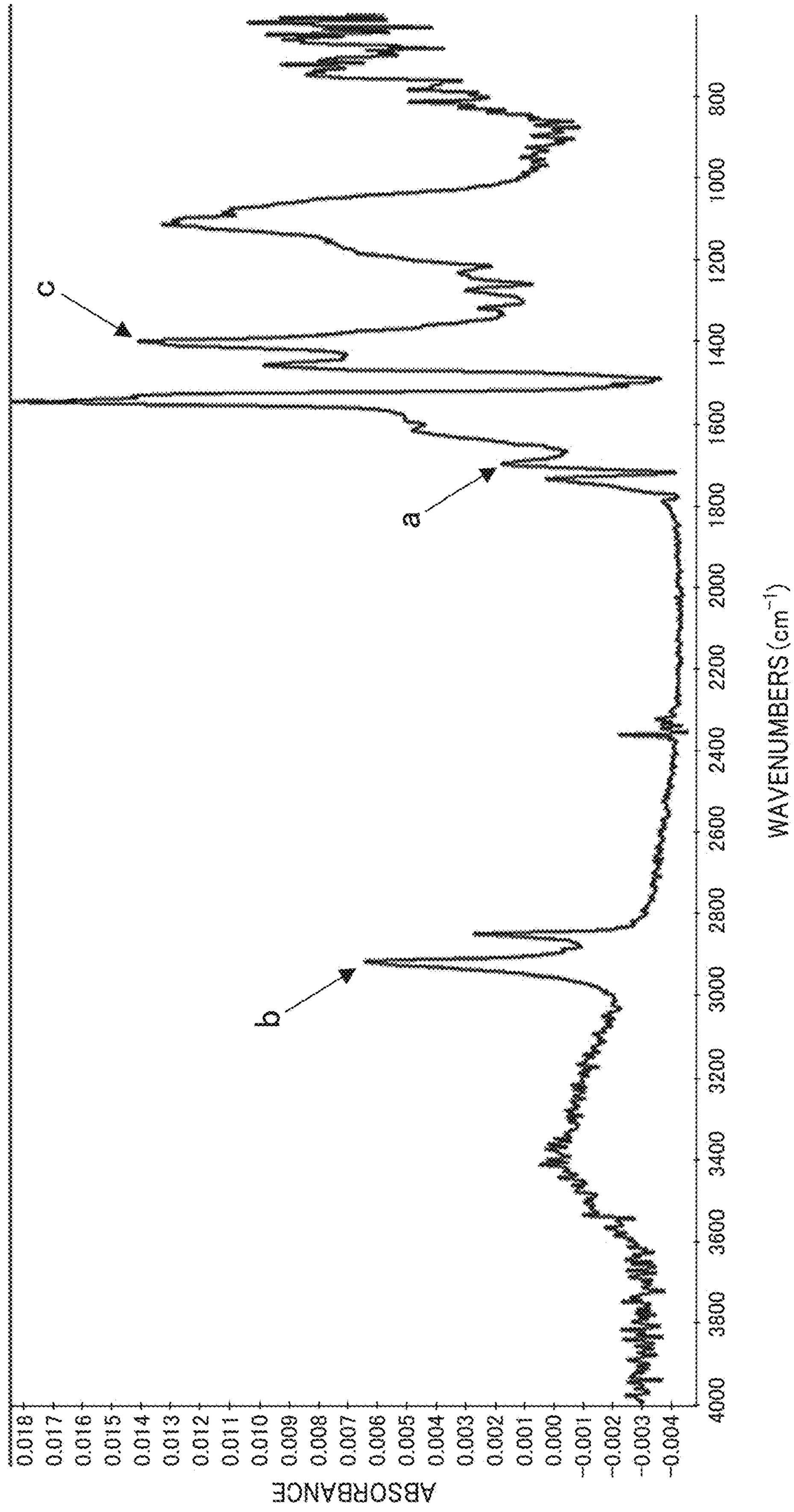
FIG. 6 is a graph illustrating a difference spectrum that is the difference between the ATR infrared absorption spectrum of the unused intermediate transfer belt and the ATR infrared absorption spectrum of the intermediate transfer belt after use.

FIG. 6 is a graph illustrating a difference spectrum that is the difference between the ATR infrared absorption spectrum of the unused intermediate transfer belt 15 and the ATR infrared absorption spectrum of the intermediate transfer belt 15 after use.

If the difference spectrum illustrated in FIG. 6 is obtained, the peak area Sa of the peak a derived from the intermediate transfer belt is calculated from the difference spectrum using a base wave number region and a peak wave number region. At this time, the base wave number region is 1690.301 to 1760.690 $cm^{-1}$, and the peak wave number region is 1707.657 to 1732.728 $cm^{-1}$.

From the difference spectrum illustrated in FIG. 6, the peak area Sb of the peak b derived from zinc stearate is also calculated using a base wave number region and a peak wave number region. At this time, the base wave number region is 2879.201 to 2988.159 $cm^{-1}$, and the peak wave number region is 2910.057 to 2925.484 $cm^{-1}$.

From the difference spectrum illustrated in FIG. 6, the peak area Sc of the peak c derived from boron nitride is also calculated using a base wave number region and a peak wave number region. At this time, the base wave number region is 1336.428 to 1430.922 $cm^{-1}$, and the peak wave number region is 1367.283 to 1381.747 $cm^{-1}$.

Then the ratio (=Sb/Sa) of the peak area Sb derived from zinc stearate to the peak area Sa derived from the intermediate transfer belt is calculated as a ZnST index that is an index value indicating the adhering amount of zinc stearate. The ratio (=Sc/Sa) of the peak area Sc derived from boron nitride to the peak area Sa derived from the intermediate transfer belt is also calculated as a BN index that is an index value indicating the adhering amount of boron nitride.

Next, an evaluation test for evaluating the relationships between the adhering amounts of the filming substances and the occurrence of the blade-curling will be described.

In the present evaluation test, the blade-curling was evaluated on intermediate transfer belts prepared under respective conditions 1 to 7 to vary the amounts of the filming substances in the outer adhering region.

A method for preparing the intermediate transfer belts under the conditions 1 to 7 will be described.

The intermediate transfer belts were prepared using a copying machine MP C5503 manufactured by Ricoh Co., Ltd. under the following conditions.

Evaluation environment: 23° C., 50%

Figure 7:
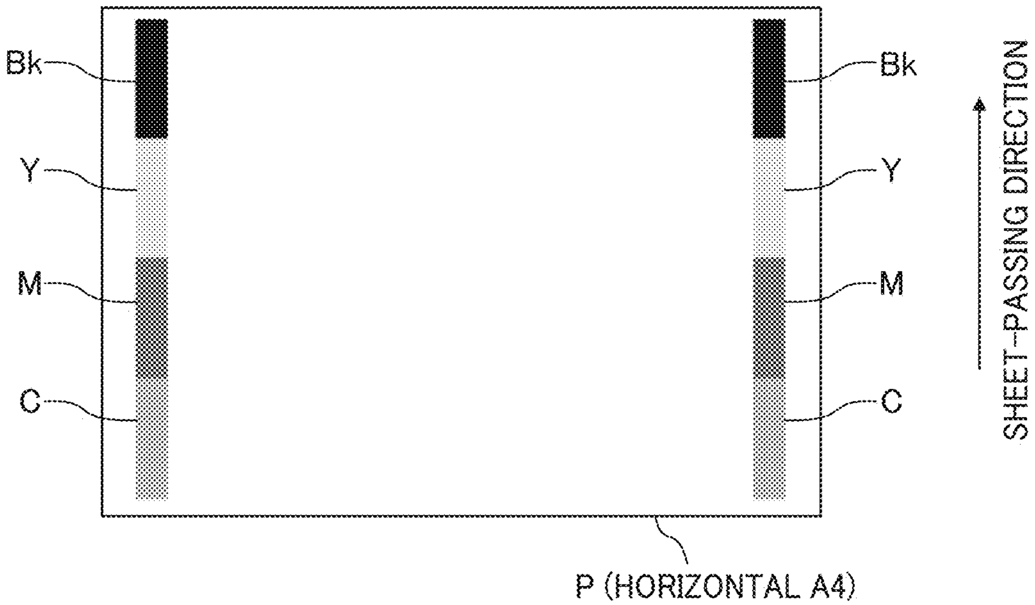
FIG. 7 is an explanatory diagram illustrating an example of a full-color running chart used in an evaluation test for evaluating the relationships between the adhering amounts of filming substances and the occurrence of blade-curling.

Running chart: a full-color vertical band 2% chart (FIG. 7), horizontal A4

Continuous sheet passing and duplex printing

Under the above conditions, the number of printed sheets was varied by 10,000 sheets, such as 10,000 passing sheets and 20,000 passing sheets, to prepare the intermediate transfer belts with the different amounts of the filming substances in the respective outer adhering regions.

Table 1 is a table illustrating the ZnST index and the presence or absence of occurrence of the blade-curling under each of the conditions 1 to 7. Table 2 is a table illustrating the BN index and the presence or absence of occurrence of the blade-curling under each of the conditions 1 to 7.

TABLE 1

| Condition | Outside of sheet | Curling |
|---|---|---|
| (1) | 0.152 | ○ |
| (2) | 0.283 | ○ |
| (3) | 0.469 | ○ |
| (4) | 0.702 | ○ |
| (5) | 0.892 | ○ |
| (6) | 0.903 | X |
| (7) | 0.965 | X |

TABLE 2

| Condition | Outside of sheet | Curling |
|---|---|---|
| (1) | 0.264 | ○ |
| (2) | 0.471 | ○ |
| (3) | 0.812 | ○ |
| (4) | 1.025 | ○ |
| (5) | 1.152 | ○ |
| (6) | 1.198 | X |
| (7) | 1.221 | X |

The ZnST index and the BN index in Tables 1 and 2 were measured on the intermediate transfer belt after the run, in a region outside the horizontal A4 sheet passing width and having no toner input, by the above-described ATR infrared absorption spectrum measurement method.

The blade-curling was evaluated using the copying machine MP C5503 manufactured by Ricoh Co., Ltd. in which the intermediate transfer belts under the above conditions 1 to 7 were attached. For each of the attached intermediate transfer belts, the cleaning blade was also replaced with a new one, and the presence or absence of the blade-curling was evaluated under the following conditions.

Evaluation environment: 32° C., 54%

Cleaning blade: a new one

Cleaning blade linear pressure: 28 N/m

Running chart: a full-color vertical band 2% chart (FIG. 7), horizontal A4

Continuous sheet passing and duplex printing

Figure 8:
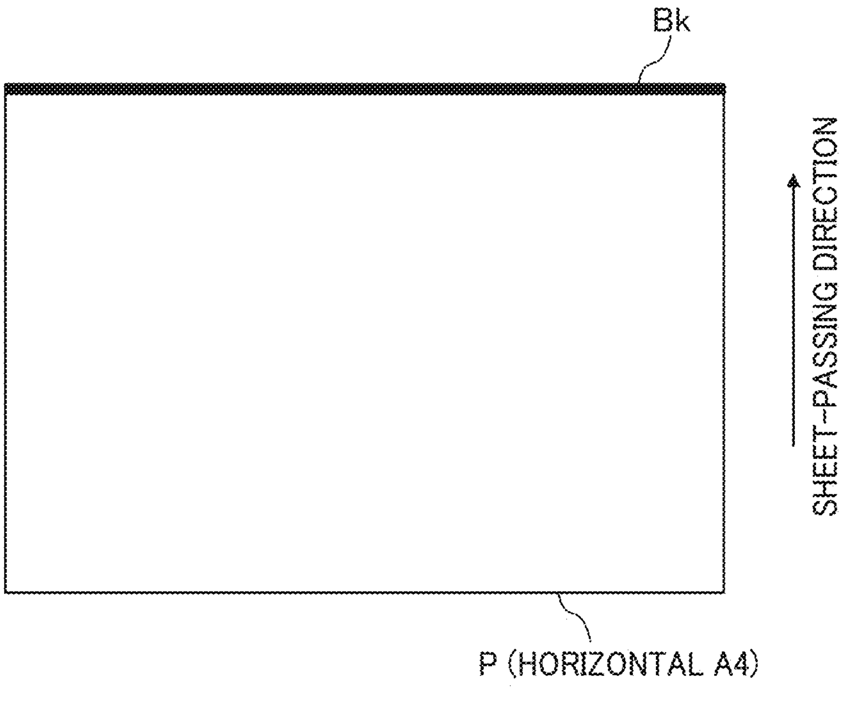
FIG. 8 is an explanatory diagram illustrating an example of a monochrome running chart used in the evaluation test.

Under the above conditions, the copying machine was operated to increase the temperature in the vicinity of the intermediate transfer belt cleaning blade to 40° C. or higher, and after the temperature in the vicinity of the intermediate transfer belt cleaning blade reached 40° C. or higher, 500 sheets of a monochrome Bk horizontal band chart (horizontal A4) illustrated in FIG. 8 were continuously passed by duplex printing to confirm the presence or absence of occurrence of the blade-curling.

As illustrated in Table 1, it was determined that the blade-curling does not occur in a case where the ZnST index is 0.892 or less.

As illustrated in Table 2, it was also determined that the blade-curling does not occur in a case where the BN index is 1.152 or less.

Next, a method in the present embodiment for making the ZnST index to 0.892 or less or the BN index to 1.152 or less in the outer adhering region of the intermediate transfer belt 15 will be described.

An example of the method in the present embodiment is a method for executing an operation of adhering toner to the outer adhering region of the intermediate transfer belt 15 at a predetermined filming removal timing. For example, a toner pattern for removing the filming may be created in a region on the photoconductor corresponding to the outer adhering region, and this toner pattern may be transferred onto the intermediate transfer belt 15. At this time, the toner pattern may also be created in a region corresponding to the sheet-passing region. The toner pattern transferred to the intermediate transfer belt 15 may not be secondarily transferred onto a recording sheet P but may only pass through the secondary transfer region to reach the intermediate transfer cleaning blade 31.

According to this method, the toner adhering to the outer adhering region of the intermediate transfer belt 15 functions as an abrasive to remove the filming substances (zinc stearate and boron nitride) adhering to the outer adhering region. As a result, the filming removal timing is appropriately set to restrict the ZnST index to 0.892 or less, and the BN index to 1.152 or less.

Another example of the above method in the present embodiment is a method for making the amount of the lubricant supplied to a region on the photoconductor corresponding to the outer adhering region smaller than the amount of the lubricant supplied to a region on the photoconductor corresponding to the sheet-passing region, in the lubricant supply device 8.

For example, the amount of the solid lubricant 8*b* scraped by the lubricant supply member 8*a* is set such that the amount of the scraped powdery lubricant supplied to a region on the photoconductor corresponding to the outer adhering region is smaller than the amount of the scraped powdery lubricant supplied to a region on the photoconductor corresponding to the sheet-passing region. Specifically, for example, the scraping ability of the lubricant supply member 8*a* is made different between these regions, or the hardness of the solid lubricant 8*b* (difficulty in scraping due to rubbing) is made different between these regions.

In a case where the hardness of the solid lubricant 8*b* is made different as described above, for example, the following may be performed. Powdery lubricant is compression-molded such that the density of the portion from which the lubricant supplied to a region on the photoconductor corresponding to the sheet-passing region is scraped is lower than the density of the portion from which the lubricant supplied to a region on the photoconductor corresponding to the outer adhering region is scraped.

Alternatively, for example, at least one of the zinc stearate content or the boron nitride content per unit volume of the solid lubricant 8*b* may be set as follows: the content of a portion of the lubricant supplied to a region on the photoconductor corresponding to the outer adhering region is smaller than the content of a portion of the lubricant supplied to a region on the photoconductor corresponding to the sheet-passing region.

In the present embodiment, the configuration in which the lubricant is supplied by the lubricant supply device 8 that supplies the powdery lubricant scraped from the solid lubricant 8*b* to the surface of the photoconductor has been described as an example. However, the lubricant supply method is not limited to this example. For example, a method for adding zinc stearate to the toner and supplying the lubricant together with the toner onto the photoconductor may be adopted. The predetermined amounts for the ZnST index and the BN index described above do not depend on lubricant supply methods.

The configurations according to the above-descried embodiments are examples, and embodiments of the present disclosure are not limited to the above-described examples. For example, the following aspects can achieve effects described below.

First Aspect

A first aspect is an image forming apparatus that executes an image forming operation of primarily transferring, to an intermediate transferor (for example, the intermediate transfer belt 15), a toner image on the surface of a latent image bearer (for example, the photoconductor 1) to which a lubricant containing zinc stearate is supplied and then secondarily transferring the toner image from the intermediate transferor onto a recording sheet P, and cleans, with a cleaning blade (for example, the intermediate transfer cleaning blade 31), the surface of the intermediate transferor after the secondary transfer including an adhering region to which the lubricant on the surface of the latent image bearer adheres, in which in a case where a difference spectrum between an ATR infrared absorption spectrum of an unused intermediate transferor and an ATR infrared absorption spectrum of the intermediate transferor after use is obtained for an outer adhering region within the width of the adhering region on the intermediate transferor, the ratio Sb/Sa of the peak area Sb derived from the zinc stearate to the peak area Sa derived from the intermediate transferor is 0.892 or less.

In an image forming apparatus that executes an image forming operation of primarily transferring, to an intermediate transferor, a toner image on the surface of a latent image bearer and then secondarily transferring the toner image from the intermediate transferor onto a recording sheet, there may conventionally occur a failure that the curling of a cleaning blade for cleaning the surface of the intermediate transferor after the secondary transfer. This is because the frictional force between the cleaning blade and the intermediate transferor increases over time, and as a result, the curling of the cleaning blade occurs.

The studies by the present inventors reveal the following conceivable cause of the occurrence of the curling of the cleaning blade for cleaning the intermediate transferor (hereinafter referred to as "blade-curling").

In an image forming apparatus that supplies a lubricant containing zinc stearate to the surface of a latent image bearer for the purpose of maintaining the lubricity of the surface of the latent image bearer for a long period of time, and the like, the lubricant supplied to the surface of the latent image bearer is transferred to an intermediate transferor. As a result, the zinc stearate of the lubricant transferred onto the surface of the intermediate transferor causes filming, and in a case where the filming deteriorates, the frictional force between the intermediate transferor and a cleaning blade for cleaning the surface of the intermediate transferor increases, and thus the blade-curling occurs. However, in a sheet-passing region on the surface of the intermediate transferor, the zinc stearate on the intermediate transferor is removed due to the contact with recording materials during image forming operations, and thus the filming is less likely to deteriorate. On the other hand, in an outer adhering region on the surface of the intermediate transferor, there is no contact with recording materials during image forming operations, and thus the zinc stearate on the intermediate transferor is not removed, and thus the filming deteriorates. Since the cleaning blade is also in contact with such an outer adhering region, the blade-curling occurs due to the filming deterioration on the outer adhering region.

The present inventors have found that the occurrence of the blade-curling is suppressed by restricting, to a predetermined amount or less, the adhering amount of the zinc stearate in the outer adhering region within the width of the adhering region on the intermediate transferor to which the lubricant from the latent image bearer adheres.

Specifically, a difference spectrum between an ATR infrared absorption spectrum of an unused intermediate transferor and an ATR infrared absorption spectrum of the intermediate transferor after use is obtained. Then the ratio of the peak area derived from zinc stearate to the peak area derived from the intermediate transferor in the difference spectrum is used as an index value indicating the adhering amount of the zinc stearate, and the ratio is made 0.892 or less. As a result, the adhering amount of the zinc stearate in the outer adhering region is restricted to such an extent that filming deterioration to such an extent that the blade-curling occurs does not occur, and thus the occurrence of the blade-curling is suppressed.

Second Aspect

A second aspect is an image forming apparatus that executes an image forming operation of primarily transferring, to an intermediate transferor, a toner image on the surface of a latent image bearer to which a lubricant containing boron nitride is supplied and then secondarily transferring the toner image from the intermediate transferor onto a recording sheet, and cleans, with a cleaning blade, the surface of the intermediate transferor after the secondary transfer including an adhering region to which the lubricant on the surface of the latent image bearer adheres, in which in a case where a difference spectrum between an ATR infrared absorption spectrum of an unused intermediate transferor and an ATR infrared absorption spectrum of the intermediate transferor after use is obtained for an outer adhering region within the width of the adhering region on the intermediate transferor, the ratio Sc/Sa of the peak area Sc derived from the boron nitride to the peak area Sa derived from the intermediate transferor is 1.152 or less.

Similarly to the zinc stearate described above, the boron nitride of the lubricant transferred onto the surface of the intermediate transferor causes filming, and in a case where the filming deteriorates, the frictional force between the intermediate transferor and the cleaning blade for cleaning the surface of the intermediate transferor increases, and thus the blade-curling occurs.

The present inventors have found that the occurrence of the blade-curling is suppressed by restricting, to a predetermined amount or less, the adhering amount of the boron nitride in the outer adhering region within the width of the adhering region on the intermediate transferor to which the lubricant from the latent image bearer adheres.

Specifically, a difference spectrum between an ATR infrared absorption spectrum of an unused intermediate transferor and an ATR infrared absorption spectrum of the intermediate transferor after use is obtained. Then the ratio of the peak area derived from boron nitride to the peak area derived from the intermediate transferor in the difference spectrum is used as an index value indicating the adhering amount of the boron nitride, and the ratio is made 1.152 or less. As a result, the adhering amount of the boron nitride in the outer adhering region is restricted to such an extent that filming deterioration to such an extent that the blade-curling occurs does not occur, and thus the occurrence of the blade-curling is suppressed.

Third Aspect

A third aspect is an image forming apparatus that executes an image forming operation of primarily transferring, to an intermediate transferor, a toner image on the surface of a latent image bearer to which a lubricant containing zinc stearate and boron nitride is supplied and then secondarily transferring the toner image from the intermediate transferor onto a recording sheet, and cleans, with a cleaning blade, the surface of the intermediate transferor after the secondary transfer including an adhering region to which the lubricant on the surface of the latent image bearer adheres, in which in a case where a difference spectrum between an ATR infrared absorption spectrum of an unused intermediate transferor and an ATR infrared absorption spectrum of the intermediate transferor after use is obtained for an outer adhering region within the width of the adhering region on the intermediate transferor, the ratio of the peak area derived from the zinc stearate to the peak area derived from the intermediate transferor is 0.892 or less, and the ratio of the peak area derived from the boron nitride to the peak area derived from the intermediate transferor is 1.152 or less.

According to this, the adhering amounts of the zinc stearate and the boron nitride in the outer adhering region are restricted to such extents that filming deterioration to such an extent that the blade-curling occurs does not occur, and thus the occurrence of the blade-curling is suppressed.

Fourth Aspect

A fourth aspect is any one of the first to third aspects including a lubricant supplier (for example, the lubricant supply device 8) that supplies the lubricant powdery and scraped from a solid lubricant **8*b***, to the surface of the latent image bearer, in which in the lubricant supplier, the scraping amount of the powdery lubricant supplied to a region on the latent image bearer corresponding to the outer adhering region is smaller than the scraping amount of the powdery lubricant supplied to a region on the latent image bearer corresponding to a sheet-passing region.

According to this, since the amount of the lubricant adhering to the outer adhering region on the intermediate transferor is restricted, the adhering amount of the zinc stearate or the boron nitride in the outer adhering region is restricted to such an extent that filming deterioration to such an extent that the blade-curling occurs does not occur. Therefore, the occurrence of the blade-curling is suppressed.

Fifth Aspect

A fifth aspect is the fourth aspect in which with respect to at least one of the zinc stearate content or the boron nitride content per unit volume of the solid lubricant **8*b*, the content of a portion of the solid lubricant 8*b* from which the powdery lubricant supplied to the region on the latent image bearer corresponding to the outer adhering region is scraped is smaller than the content of a portion of the solid lubricant 8*b*** from which the powdery lubricant supplied to the region on the latent image bearer corresponding to the sheet-passing region is scraped.

According to this, of the lubricant adhering to the outer adhering region on the intermediate transferor, the amount of the zinc stearate or the boron nitride, which is a substance (filming substance) that causes the blade-curling, is restricted. Therefore, the adhering amount of the zinc stearate or the boron nitride in the outer adhering region is restricted to such an extent that filming deterioration to such an extent that the blade-curling occurs does not occur, and thus the occurrence of the blade-curling is suppressed.

Sixth Aspect

A sixth aspect is the fifth aspect in which the solid lubricant **8*b* contains both the zinc stearate and the boron nitride, the boron nitride content of the portion of the solid lubricant 8*b* from which the powdery lubricant supplied to the region on the latent image bearer corresponding to the outer adhering region is scraped is smaller than the boron nitride content of the portion of the solid lubricant 8*b*** from which the powdery lubricant supplied to the region on the latent image bearer corresponding to the sheet-passing region is scraped, and the zinc stearate content is uniform in both the portions.

According to this, the function of the zinc stearate as a lubricant is uniformly imparted over both the sheet-passing region and the outer adhering region, and the amount of the boron nitride adhering to the outer adhering region on the intermediate transferor is restricted. Therefore, the adhering amount of the boron nitride in the outer adhering region is restricted to such an extent that filming deterioration to such an extent that the blade-curling occurs does not occur, and thus the occurrence of the blade-curling is suppressed.

Seventh Aspect

A seventh aspect is any one of the fourth to sixth aspects in which the solid lubricant **8*b* is obtained by compression-molding a powdery lubricant such that the density of the portion of the solid lubricant 8*b* from which the powdery lubricant supplied to the region on the latent image bearer corresponding to the sheet-passing region is scraped is lower than the density of the portion of the solid lubricant 8*b*** from which the powdery lubricant supplied to the region on the latent image bearer corresponding to the outer adhering region is scraped.

According to this, since the amount of the lubricant adhering to the outer adhering region on the intermediate transferor is restricted, the adhering amount of the zinc stearate or the boron nitride in the outer adhering region is restricted to such an extent that filming deterioration to such an extent that the blade-curling occurs does not occur. Therefore, the occurrence of the blade-curling is suppressed.

Eighth Aspect

An eighth aspect is any one of the first to seventh aspects in which the lubricant is added to toner constituting the toner image.

Since the toner adheres to the sheet-passing region but does not adhere to the outer adhering region, the amount of the lubricant adhering to the outer adhering region on the intermediate transferor is restricted. Therefore, the adhering amount of the zinc stearate or the boron nitride in the outer adhering region is restricted to such an extent that filming deterioration to such an extent that the blade-curling occurs does not occur, and thus the occurrence of the blade-curling is suppressed.

Ninth Aspect

A ninth aspect is any one of the first to eighth aspects in which toner is adhered to the outer adhering region of the intermediate transferor at a predetermined filming removal timing.

According to this, the polishing function of the toner is used to remove the zinc stearate or the boron nitride adhering to the outer adhering region of the intermediate transferor. Therefore, the adhering amount of the zinc stearate or the boron nitride in the outer adhering region is restricted, and thus the occurrence of the blade-curling is suppressed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus, comprising:

a latent image bearer having a surface onto which a lubricant comprising zinc stearate is supplied, the latent image bearer configured to bear a toner image on the surface;

an intermediate transferor having a surface onto which the toner image is transferred, the surface including an adhering region to which the lubricant from the surface of the latent image bearer adheres;

a primary transferor configured to primarily transfer the toner image from the surface of the latent image bearer to the surface of the intermediate transferor;

a second transferor configured to secondarily transfer the toner image from the surface of the intermediate transferor to a recording sheet; and a cleaning blade configured to clean the surface of the intermediate transferor including the adhering region, after the toner image is secondarily transferred, wherein in a region outside at least a horizontal A4 sheet passing width on the intermediate transferor, a ratio between a peak area of the ATR infrared absorption spectrum derived from zinc stearate on the intermediate transferor after use is 0.892 or less.

2. The image forming apparatus according to claim 1, further comprising:

a lubricant supplier configured to supply the lubricant in powder form to the surface of the latent image bearer, the lubricant in powder form scraped from a solid lubricant, wherein, in the lubricant supplier, a scraping amount of the lubricant in powder form supplied to a region on the latent image bearer corresponding to the region outside at least the horizontal A4 sheet passing width on the intermediate transferor is smaller than a scraping amount of the lubricant in powder supplied to a region on the latent image bearer corresponding to a sheet-passing region on the intermediate transferor.

3. The image forming apparatus according to claim 2, wherein a zinc stearate content per unit volume in a first portion of the solid lubricant from which the lubricant in powder form supplied to the region on the latent image bearer corresponding to the region outside at least the horizontal A4 sheet passing width is scraped is lower than a zinc stearate content per unit volume in a second portion of the solid lubricant from which the lubricant in powder form supplied to the region on the latent image bearer corresponding to the sheet-passing region on the intermediate transferor is scraped.

4. The image forming apparatus according to claim 3, wherein the solid lubricant further comprises boron nitride;

a boron nitride content per unit volume in the first portion of the solid lubricant is lower than a boron nitride content in the second portion of the solid lubricant; and the zinc stearate content per unit volume is uniform in both the first portion and the second portion.

5. The image forming apparatus according to claim 2, wherein the solid lubricant is a compression-molded product of a powdery lubricant, and a density of a portion of the solid lubricant from which the lubricant in powder form supplied to the region on the latent image bearer corresponding to the sheet-passing region is scraped is lower than a density of a portion of the solid lubricant from which the lubricant in powder form supplied to the region on the latent image bearer corresponding to the region outside at least the horizontal A4 sheet passing width is scraped.

6. The image forming apparatus according to claim 1, wherein toner of the toner image comprises the lubricant as additive.

7. The image forming apparatus according to claim 1, wherein the primary transferor is configured to:

cause toner to adhere to the region outside at least the horizontal A4 sheet passing width on the intermediate transferor at a desired filming removal timing.

8. An image forming apparatus, comprising:

a latent image bearer having a surface onto which a lubricant comprising boron nitride is supplied, the latent image bearer configured to bear a toner image on the surface;

an intermediate transferor having a surface onto which the toner image is transferred, the surface including an adhering region to which the lubricant from the surface of the latent image bearer adheres;

a primary transferor configured to primarily transfer the toner image from the surface of the latent image bearer to the surface of the intermediate transferor;

a second transferor configured to secondarily transfer the toner image from the surface of the intermediate transferor to a recording sheet; and a cleaning blade configured to clean the surface of the intermediate transferor including the adhering region, after the toner image is secondarily transferred, wherein in a region outside at least a horizontal A4 sheet passing width on the intermediate transferor, a ratio between a peak area of an attenuated total reflection (ATR) infrared absorption spectrum derived from boron nitride on the intermediate transferer in an unused state and a peak area of the ATR infrared absorption spectrum derived from boron nitride on the intermediate transferor after use is 1.152 or less.

9. The image forming apparatus according to claim 8, further comprising a lubricant supplier configured to supply the lubricant in powder form to the surface of the latent image bearer, the lubricant in powder form scraped from a solid lubricant, wherein, in the lubricant supplier, a scraping amount of the lubricant in powder form supplied to a region on the latent image bearer corresponding to the region outside at least the horizontal A4 sheet passing width on the intermediate transferor is smaller than a scraping amount of the lubricant in powder form supplied to a region on the latent image bearer corresponding to a sheet-passing region on the intermediate transferor.

10. The image forming apparatus according to claim 9, wherein a boron nitride content per unit volume in a first portion of the solid lubricant from which the lubricant in powder form supplied to the region on the latent image bearer corresponding to the region outside at least the horizontal A4 sheet passing width is scraped is lower than a boron nitride content per unit volume in a second portion of the solid lubricant from which the lubricant in powder form supplied to the region on the latent image bearer corresponding to the sheet-passing region on the intermediate transferor is scraped.

11. The image forming apparatus according to claim 10, wherein the solid lubricant further comprises zinc stearate; and a zinc stearate content per unit volume is uniform in both the first portion and the second portion.

12. The image forming apparatus according to claim 9, wherein the solid lubricant is a compression-molded product of a powdery lubricant; and a density of a portion of the solid lubricant from which the lubricant in powder form supplied to the region on the latent image bearer corresponding to the sheet-passing region is scraped is lower than a density of a portion of the solid lubricant from which the lubricant in powder form supplied to the region on the latent image bearer corresponding to the region outside at least the horizontal A4 sheet passing width is scraped.

13. The image forming apparatus according to claim 8, wherein toner of the toner image comprises the lubricant as additive.

14. The image forming apparatus according to claim 8, wherein the primary transferor is configured to:

cause toner to adhere the region outside at least the horizontal A4 sheet passing width on the intermediate transferor at a desired filming removal timing.

15. An image forming apparatus, comprising:

a latent image bearer having a surface onto which a lubricant comprising zinc stearate and boron nitride is supplied, the latent image bearer configured to bear a toner image on the surface;

an intermediate transferor having a surface onto which the toner image is transferred, the surface including an adhering region to which the lubricant from the surface of the latent image bearer adheres;

a primary transferor configured to primarily transfer the toner image from the surface of the latent image bearer to the surface of the intermediate transferor;

a second transferor configured to secondarily transfer the toner image from the surface of the intermediate transferor to a recording sheet; and a cleaning blade configured to clean the surface of the intermediate transferor including the adhering region, after the toner image is secondarily transferred, wherein in a region outside at least a horizontal A4 sheet passing width on the intermediate transferor, a ratio between a first peak area of an attenuated total reflection (ATR) infrared absorption spectrum derived from zinc stearate on the intermediate transferor in an unused state and a second peak area of the ATR infrared absorption spectrum derived from zinc stearate on the intermediate transferor after use is 0.892 or less, and a ratio of a third peak area of the ATR infrared absorption spectrum derived from boron nitride on the intermediate transferor in the unused state and a fourth peak area of the ATR infrared absorption spectrum derived from boron nitride on the intermediate transferor after use is 1.152 or less.

16. The image forming apparatus according to claim 15, further comprising:

a lubricant supplier configured to supply the lubricant in powder form to the surface of the latent image bearer, the lubricant in power form scraped from a solid lubricant, wherein, in the lubricant supplier, a scraping amount of the lubricant in powder form supplied to a region on the latent image bearer corresponding to the region outside at least the horizontal A4 sheet passing width on the intermediate transferor is smaller than a scraping amount of the lubricant in powder form supplied to a region on the latent image bearer corresponding to a sheet-passing region on the intermediate transferor.

17. The image forming apparatus according to claim 16, wherein with respect to a content of at least one of zinc stearate or boron nitride per unit volume of the solid lubricant, the content in a first portion of the solid lubricant from which the lubricant in powder form supplied to the region on the latent image bearer corresponding to the region outside at least the horizontal A4 sheet passing width is scraped is lower than the content in a second portion of the solid lubricant from which the lubricant in powder form supplied to the region on the latent image bearer corresponding to the sheet-passing region on the intermediate transferor is scraped.

18. The image forming apparatus according to claim 17, wherein a boron nitride content per unit volume in the first portion of the solid lubricant is lower than a boron nitride content per unit volume in the second portion of the solid lubricant; and a zinc stearate content per unit volume is uniform in both the first portion and the second portion.

19. The image forming apparatus according to claim 16, wherein the solid lubricant is a compression-molded product of a powdery lubricant, and a density of a portion of the solid lubricant from which the lubricant in powder form supplied to the region on the latent image bearer corresponding to the sheet-passing region is scraped is lower than a density of a portion of the solid lubricant from which the lubricant in powder form supplied to the region on the latent image bearer corresponding to the region outside at least the horizontal A4 sheet passing width is scraped.

20. The image forming apparatus according to claim 15, wherein toner of the toner image comprises the lubricant as additive.

* * * * *